US008693568B2

(12) United States Patent
Lee et al.

(10) Patent No.: US 8,693,568 B2
(45) Date of Patent: Apr. 8, 2014

(54) METHOD AND APPARATUS FOR ESTIMATING CHANNEL USING DEDICATED PILOT SIGNAL IN OFDM-BASED WIRELESS COMMUNICATION SYSTEM

(75) Inventors: Yong-Hwan Lee, Seoul (KR); Han-Jun Park, Seoul (KR); Keon-Wook Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 0 days.

(21) Appl. No.: 13/479,939

(22) Filed: May 24, 2012

(65) Prior Publication Data

US 2013/0034177 A1  Feb. 7, 2013

Related U.S. Application Data

(63) Continuation-in-part of application No. PCT/KR2010/ 008401, filed on Nov. 25, 2010.

(30) Foreign Application Priority Data

Nov. 25, 2009  (KR) .................. 10-2009-0114509

(51) Int. Cl.
  *H04B 7/02* (2006.01)
(52) U.S. Cl.
  USPC ........... 375/267; 375/260; 375/299; 375/347; 375/349
(58) Field of Classification Search
  USPC ................ 375/267, 260, 299, 347, 349
  See application file for complete search history.

(56) References Cited

U.S. PATENT DOCUMENTS

| 2008/0153446 | A1  | 6/2008 | Isaac et al. |
| 2008/0225993 | A1  | 9/2008 | Malladi et al. |
| 2009/0041150 | A1* | 2/2009 | Tsai et al. ............. 375/267 |

FOREIGN PATENT DOCUMENTS

| KR | 1020090119995 A | 3/2011 |
| WO | WO 2006/088252 | 8/2006 |
| WO | WO 2009/094135 A2 | 7/2009 |
| WO | PCT/KR2010/008401 | 11/2009 |
| WO | WO 2011/065764 A2 | 3/2011 |
| WO | WO 2011/065764 A3 | 3/2011 |

OTHER PUBLICATIONS

Hongzhong Yan at al., "Dedicated Reference Signal Based Channel Estimation using Weighted Averaging Scheme in OFDM Systems", 5 pages, IEEE 2010, Ottawa, Ontario, Canada.

* cited by examiner

*Primary Examiner* — Kabir A Timory
(74) *Attorney, Agent, or Firm* — Wells St. John P.S.

(57) ABSTRACT

The invention relates to a method for channel estimation using a dedicated pilot signal in an OFDM-based communication system with multi-antenna transmission techniques. The receiver estimates the statistical characteristics of a virtual channel generated by beamforming by exploiting the statistical characteristics of common pilot channel, determines the optimum dedicated pilot pattern, and estimates the channel from dedicated pilot signal transmitted in an optimum pattern by means of AMMSE interpolation. The invention minimizes the channel estimation error by exploiting the statistical characteristics of the virtual channel, and optimally determines the dedicated pilot pattern according to the operation environment to maximize the transmission performance in terms of the pilot signaling overhead and the channel estimation error. In particular, the invention is very effective in low signal-to-interference plus noise power ratio (SINR) operation environments.

20 Claims, 8 Drawing Sheets

METHOD AND APPARATUS FOR ESTIMATING CHANNEL USING DEDICATED PILOT SIGNAL IN OFDM-BASED WIRELESS COMMUNICATION SYSTEM

CROSS REFERENCE TO RELATED APPLICATION

This application is a continuation-in-part of PCT International Application No. PCT/KR2010/008401, filed on Nov. 25, 2010, which claimed priority to Korean Application No. 10-2009-0114509, filed on Nov. 25, 2009, the entire disclosures of which are incorporated by reference as a part of this application.

BACKGROUND OF THE INVENTION

1. Field of the Invention

The present invention relates to a method and apparatus for channel estimation using a dedicated pilot signal in an orthogonal frequency division multiplexing (OFDM)-based wireless communication system using multi-antenna transmission techniques.

2. Description of the Related Art

An OFDM wireless communication system with multi-input multi-output (MIMO) techniques can increase the channel capacity using a spatial multiplexing technique and improve the reliability of data transmission using a diversity technique. Accurate channel estimation at the receiver is indispensable to maximize the performance of a MIMO OFDM-based wireless communication system. The channel information is often estimated using common pilot signal orthogonally allocated to each transmit antenna in the downlink of a MIMO OFDM-based wireless communication system. However, this technique may suffer from high pilot signaling overhead because the amount of common pilot signal increases in linear proportion to the number of transmit antennas. If the MIMO system uses the same amount of pilot signaling overhead as the single antenna system, it can use reduced pilot signal for each antenna, yielding poor channel estimation (i.e., increase of the mean square error (MSE) in channel estimation) in low signal-to-interference plus noise power ratio (SINR) channel environments.

In order to alleviate this problem, the fourth-generation (4G) wireless communication systems, such as IEEE 802.16m and 3GPP LTE, consider the use of a dedicated (or user specific) pilot signal. In an MIMO system which employs a transmit beamforming technique, the data signal is transmitted through a virtual channel which is generated by multiplying the channel with the beam weight vector for the transmit beamforming. The dedicated pilot signal is also transmitted by means of transmit beamforming with the same beam weight identical as that of data signal. The use of dedicated pilot signal is effective in low-SINR environments (e.g., near the cell boundary) mainly because of the reduction of pilot signaling overhead and the effect of beamforming gain as well.

The statistical characteristics of the virtual channel are different from those of individual antenna channel. Moreover, the amount of resource allocated to the dedicated pilot signal is very small. As a consequence, it may not be easy to estimate the statistical characteristics of the virtual channel from the received dedicated pilot signal. Conventional technologies often employs a linear interpolation (LI) technique because of the simplicity (i.e., it does not require the statistical characteristics of the virtual channel). However, the LI technique may be vulnerable to the presence of interference and noise (e.g., near the cell boundary). It also may not be able to minimize the pilot signaling overhead because it cannot optimally determine the pilot pattern according to the channel environment.

The use of a dedicated pilot signal considered in the 4G wireless communication systems is very effective in low-SINR environments mainly due to the improvement of transmit power gain from the beamforming and the reduction of the pilot signaling overhead. However, it may not be easy to estimate the statistical characteristics of the virtual channel because the dedicated pilot signal is allocated to a specific user using a small amount of resource. As a consequence, the use of statistical estimation techniques (e.g., the minimum mean squared estimation (MMSE)) may not be applicable to the channel estimation with the use of dedicated pilot signal, which may limit the exploitation of the dedicated pilot signal in the channel estimation.

SUMMARY OF THE INVENTION

In order to overcome the above-described limitations in the use of dedicated pilot signal, the present invention proposes a method and apparatus which can estimate the statistical characteristics of the virtual channel, generated by the transmit beamforming, using the statistical characteristics of the common pilot channel, determine the dedicated pilot pattern to maximize the system transmission rate, and estimate the virtual channel from the dedicated pilot signal. As a result, it can be possible to noticeably improve the channel estimation accuracy in low SINR environments by employing an optimum channel estimation technique with the use of statistical characteristics of the virtual channel, while improving the pilot transmit power and the reduction of pilot signaling overhead.

In order to accomplish the said object, the present invention providing a method and apparatus for the channel estimation using dedicated pilot signal in an OFDM-based wireless communication system with transmit beamforming includes the step and the unit for the estimation of the statistical characteristics of the virtual channel, which is generated by the transmit beamforming, using the statistical characteristics of the common pilot channel; the step and the unit for the determination of the dedicated pilot signal pattern using the estimated statistical characteristics of the virtual channel; and the step and the unit for the channel estimation using the dedicated pilot signal.

DESCRIPTION OF THE PREFERRED EMBODIMENTS

Preferred embodiments of the present invention will be described in what follows with reference to the accompanying drawings. In the following description, detailed descriptions of known functions and constructions which have been deemed to make the gist of the present invention vague will be omitted.

A method and apparatus according to embodiments of the present invention will be described below which, in an OFDM-based wireless communication system with multi-antenna techniques (e.g., coherent beamforming (CBF) or eigen-beamforming (EBF) technique), estimates the statistical characteristics of virtual channel generated by multi-antenna transmission techniques, using the statistical characteristics of common pilot channel; determines the dedicated pilot pattern maximizing the system transmission rate using the estimated statistical characteristics of the virtual channel, and estimates the virtual channel from the dedicated pilot pattern.

A MEMO OFDM-based wireless communication system using dedicated pilot signal with $N_T$ transmit antennas will be considered. Let $P_d(n,k)$ be the dedicated pilot signal allocated to the n-th OFDM symbol and the k-th subcarrier in the wireless communication system. When the wireless communication system transmits the signal by means of beamforming with an $(N_T \times 1)$-unit norm beam weight vector, the received pilot signal can be represented by Equation 1:

$$Y(n,k) = H(n,k)w(n,k)P_d(n,k) + N(n,k) \quad (1)$$

where $H(n,k)$ is a $(1 \times N_T)$-unit norm channel vector comprising zero-mean independently and identically distributed (i.i.d.) complex Gaussian random variables with the same variance $\sigma_H^2$, and $N(n,k)$ is additive white Gaussian noise (AWGN) with variance $\sigma_N^2$. Here, each element of $H(n,k)$ represents common pilot channel and the virtual channel due to the beamforming can be represented by the following Equation 2:

$$H_w(n,k) = H(n,k)w(n,k) \quad (2)$$

Let $H_i(n,k)$ be the i-th element of the channel vector $H(n,k)$. Assuming that the channel is a wide sense stationary process, the correlation function of the common pilot channel can be defined by the following Equation 3:

$$r_H(\Delta n, \Delta k) = E\{H_i(n+\Delta n, k+\Delta k)H^*_i(n,k)\}$$
$$\text{for } i=1,\ldots,N_t \quad (3)$$

where $\Delta n$ and $\Delta k$ are the OFDM symbol interval in the time domain and the subcarrier interval in the frequency domain, $E\{\cdot\}$ is the expectation operator, and the superscript * denotes the complex conjugate operator. The correlation function of the virtual channel can be defined by the following Equation 4:

$$r_{H_w}(\Delta n, \Delta k) = E\{H_w(n+\Delta n, k+\Delta k)H^*_w(n,k)\} \quad (4)$$

Figure 1:
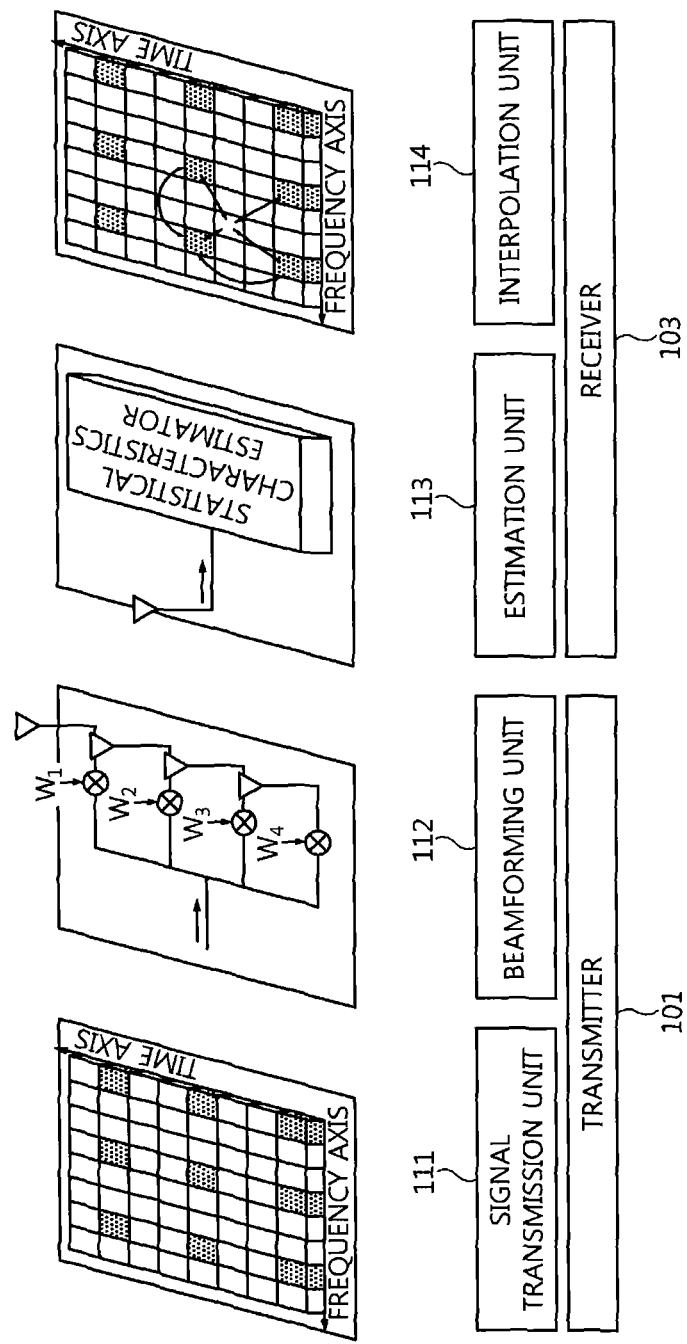
FIG. 1 is a diagram showing the schematic configuration of a transmitter and a receiver which adaptively estimate the channel information using a dedicated pilot signal in a wireless communication system, according to an embodiment of the present invention.

FIG. 1 is a diagram showing the schematic configuration of a transceiver which estimates the channel using dedicated pilot signal in a wireless communication system, according to an embodiment of the present invention.

The transmitter 101 includes a signal transmission unit 111 and a beamforming unit 112. The transmission unit 111 transmits data and dedicated pilot signal having a unique pattern. The beamforming unit 112 generates transmit signal by applying the beam weight to the data and dedicated pilot signal, and transmits it through $N_T$ transmit antennas.

The receiver 103 includes an estimation unit 113 and an interpolation unit 114. The estimation unit 113 estimates the statistical characteristics of virtual channel generated by the beamforming unit 112. The interpolation unit 132 estimates the virtual channel by interpolating the estimated virtual channel by means of affine MMSE based on the estimated statistical characteristics of the virtual channel.

Figure 2:
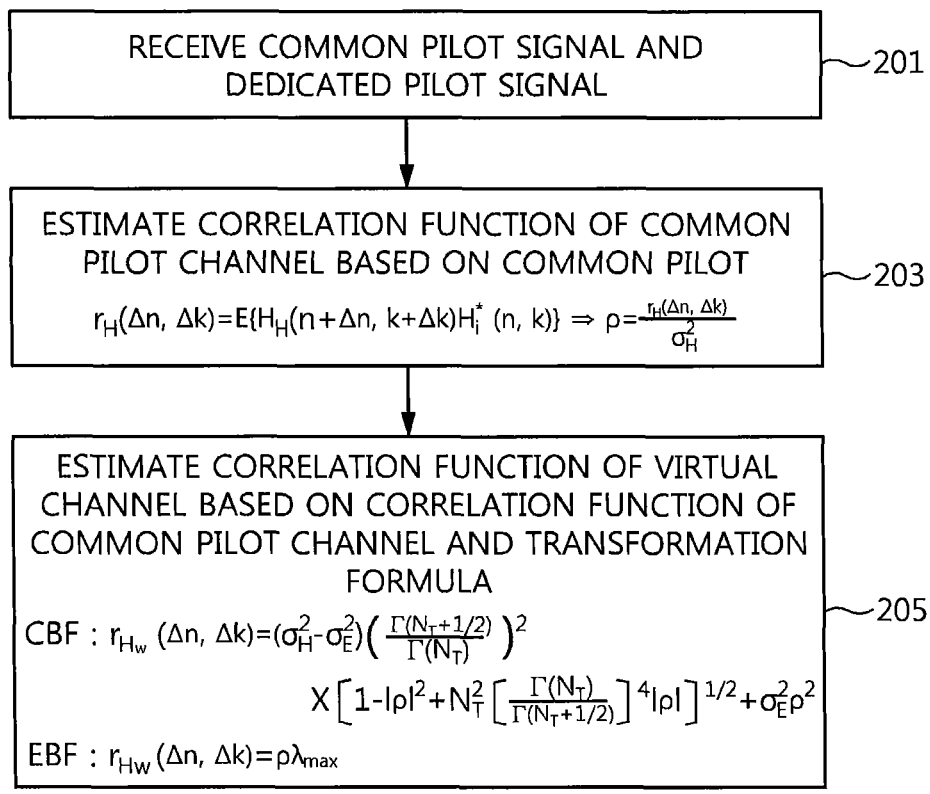
FIG. 2 is a diagram showing a method of estimating the statistical characteristics of a virtual channel in a wireless communication system to which transmit beamforming techniques have been applied, according to an embodiment of the present invention.

FIG. 2 is a diagram showing the process for the estimation the statistical characteristics of the virtual channel generated by the transmit beamforming, according to an embodiment of the present invention.

At step 201, the receiver receives common pilot signal and dedicated pilot signal as well. At step 203, the receiver estimates the correlation function of the common pilot channel from the received common pilot signal, by Equation 3. At step 205, the receiver estimates the correlation function of the virtual channel from the correlation function of the common pilot channel, estimated at step 203.

The method for the estimation of the correlation function of the virtual channel depends on the transmit beamforming technique. If the CBF technique according to an embodiment of the present invention is used, the correlation function of the virtual channel can be estimated using the following Equation 5

$$r_{H_w}(\Delta n, \Delta k) = (\sigma_H^2 \to \sigma_E^2)\left(\frac{\Gamma(N_T + 1/2)}{\Gamma(N_T)}\right)^2 \quad (5)$$
$$\left(1 - |\rho|^2 + N_T^2\left(\frac{\Gamma(N_T)}{\Gamma(N_T + 1/2)}\right)^4 |\rho|\right)^{1/2} + \sigma_E^2 \rho^2$$

where $\Delta n$ and $\Delta k$ are respectively the OFDM symbol interval in the time domain and the subcarrier interval in the frequency domain, $\sigma_H^2$ and $\sigma_E^2$ are respectively the variance of the channel and the beam weight vector, $N_T$ is the number of transmit antennas, $\Gamma(\cdot)$ is the gamma function, and $\rho$ is the normalized correlation function of the common pilot channel, which is represented by the following Equation 6:

$$\rho = \frac{r_H(\Delta n, \Delta k)}{\sigma_H^2} \quad (6)$$

If the EBF technique according to another embodiment of the present invention is used, the correlation function of the virtual channel can be estimated using the following Equation 7

$$r_{H_w}(\Delta n, \Delta k) = \rho \lambda_{max} \quad (7)$$

where Δn and Δk are respectively the OFDM symbol interval in the time domain and the subcarrier interval in the frequency domain, ρ is the normalized correlation function of the common pilot channel, and $\lambda_{max}$ is the maximum eigenvalue of the spatial correlation matrix of the channel, obtained by means of eigenvalue decomposition. The spatial correlation matrix is defined by the following Equation 8:

$$R = E\{H^H(n,k)H(n,k)\} \tag{8}$$

Figure 3:
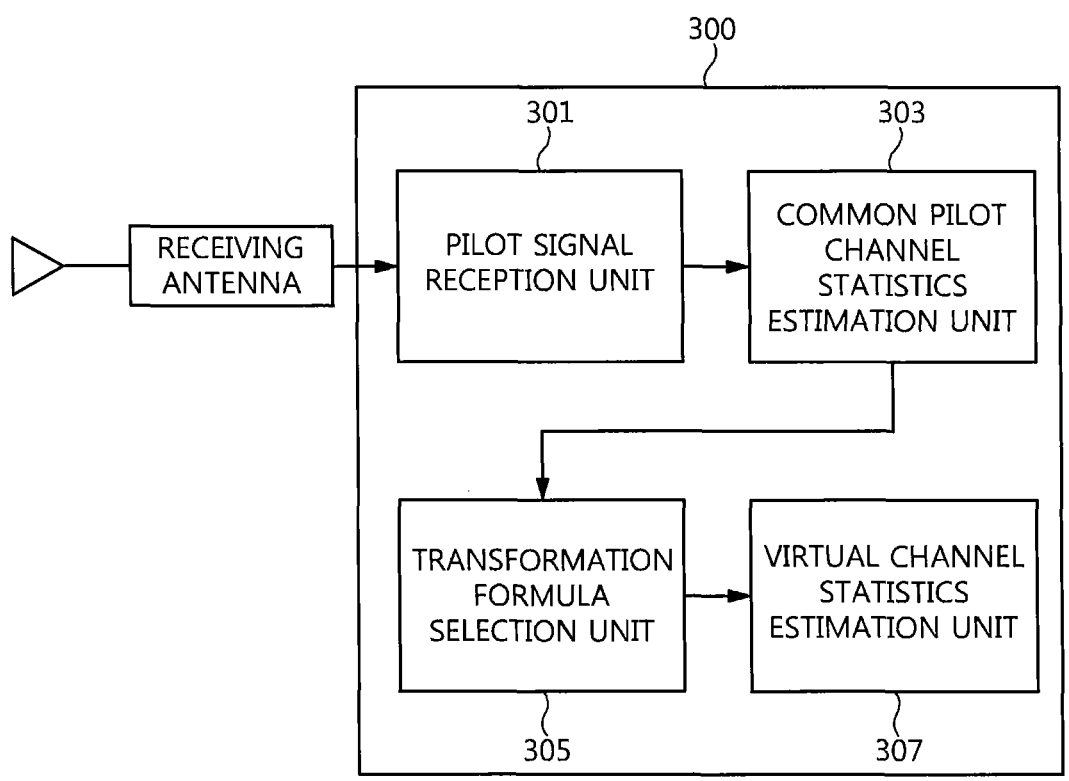
FIG. 3 is a diagram showing the detailed configuration of the correlation function estimation unit included in the unit to estimate statistical characteristics of the virtual channel of FIG. 1.

FIG. 3 is a diagram showing the detailed configuration of the correlation function estimation unit included in the unit that estimates the statistical characteristics of the virtual channel of FIG. 1.

The correlation function estimation unit 300 includes a pilot signal reception unit 301, a common pilot channel statistics estimation unit 303, a transformation formula selection unit 305, and a virtual channel statistics estimation unit 307.

The pilot signal reception unit 301 receives common pilot signal and dedicated pilot signal transmitted from the transmitter. The common pilot channel statistics estimation unit 303 estimates the correlation function of the common pilot channel using the received common pilot signal.

The transformation formula selection unit 305 selects Equation 5 when the CBF technique is used, and Equation 7 when the EBF technique is used, and transfers it to the virtual channel statistics estimation unit 307.

The virtual channel statistics estimation unit 307 estimates the correlation function of the virtual channel by applying the transformation formula determined by the transformation formula selection unit 305 to the correlation function of the common pilot channel estimated by the common pilot channel statistics estimation unit 303.

Figure 4:
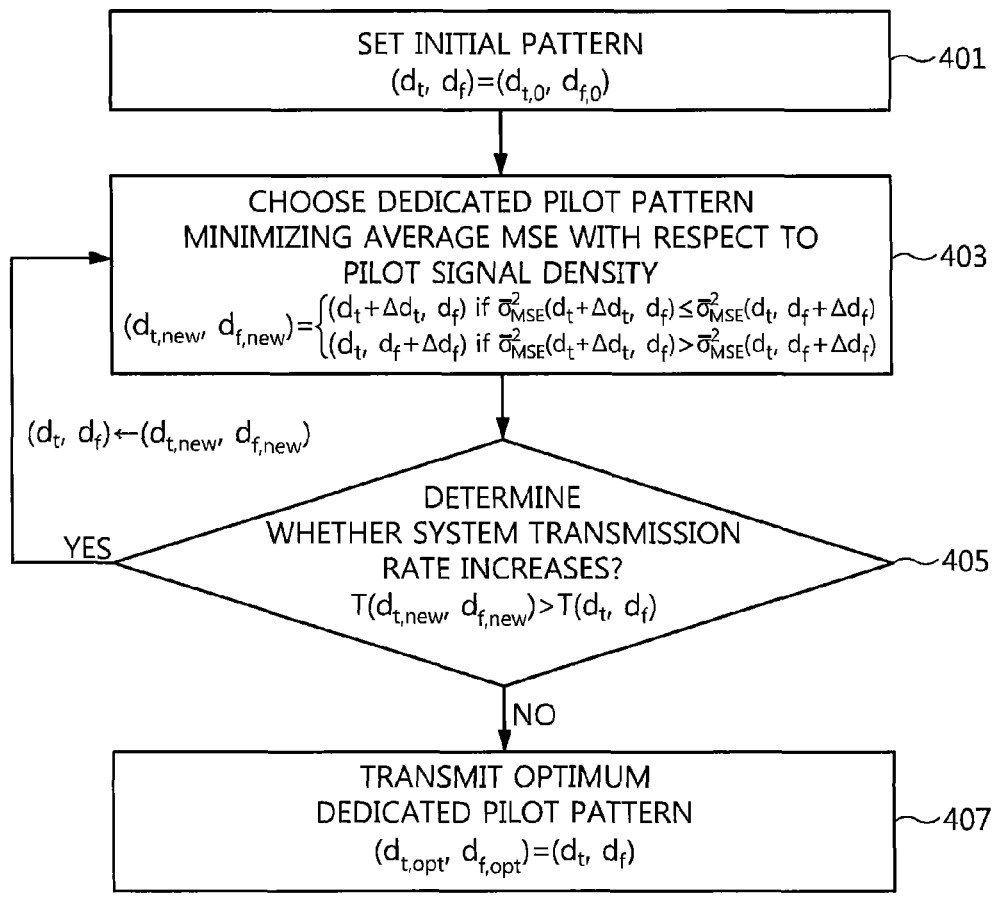
FIG. 4 is a diagram showing the method for the determination of dedicated pilot pattern in a wireless communication system with transmit beamforming, according to an embodiment of the present invention.

FIG. 4 is a diagram showing a method of optimally determining the dedicated pilot pattern in a wireless communication system with transmit beamforming, according to an embodiment of the present invention.

At step 401, an initial pattern is determined by the following Equation 9:

$$(d_t, d_f) = (d_{t,0}, d_{f,0}) \tag{9}$$

where $d_t$ is the OFDM symbol interval of the dedicated pilot in the time domain and $d_f$ is the subcarrier interval of the dedicated pilot in the frequency domain.

At step 403, the average MSE with the use of dedicated pilot pattern $(d_t + \Delta d_t, d_f)$ is compared with that with the use of dedicated pilot pattern $(d_t, d_f + \Delta d_f)$ using the correlation function of the virtual channel estimated at step 205 of FIG. 2, and then the dedicated pilot pattern yielding a smaller MSE is selected, where $\Delta d_t$ and $\Delta d_f$ are a fixed unit for the spacing of pilot signal in the time and the frequency domain, respectively. In general, the initial pattern $(d_{t,0}, d_{f,0})$, and the spacing intervals $\Delta d_t$ and $\Delta d_f$ can be set to 1, corresponding to the minimum interval of the OFDM symbol and the subcarrier.

At step 403, the increase of the spacing interval (i.e., the reduction of the pilot signal density) of the pilot signal in the time or frequency domain should be selected so as to less increase in the MSE due to the reduction of the pilot signal density. In particular, repeated processing of step 403 may converge to a dedicated pilot pattern that minimizes the average MSE with respect to the density of the pilot signal.

At step 403, when the receiver estimates the virtual channel using an interpolation filter with $N_t$ taps in the time domain and $N_f$ taps in the frequency domain, it calculates the average MSE for the channel estimation in the resource region defined by the following Equation 10:

$$S = \{(n'', k'') | n' \leq n'' \leq n' + (N_t - 1) d_t, k' \leq k'' \leq k' + (N_f - 1) d_f\} \tag{10}$$

where n' and k' are the location of the OFDM symbol and subcarrier of the received dedicated pilot signal in the time and frequency domain, respectively, n'' and k'' are the location of the OFDM symbol and subcarrier to be estimated in the time and frequency domain, respectively, and $(d_t, d_f)$ is the pattern of the dedicated pilot signal transmitted from the transmitter.

The average MSE for the channel estimation is calculated in the resource region S defined by Equation 10 by the following Equation 11:

$$\overline{\sigma}_{MSE}^2(d_t, d_f) = \sum_{n''=n'}^{n'+(N_t-1)d_t} \sum_{k''=k'}^{k'+(N_f-1)d_f} \sigma_{MSE}^2(n'', k'', d_t, d_f) \tag{11}$$

where $\sigma_{MSE}^2(n'', k'', d_t, d_f)$ denotes the MSE when the channel at the n''-th OFDM symbol and the k''-th subcarrier is estimated by means of AMMSE interpolation, represented as the following Equation 12:

$$\sigma_{MSE}^2(n'',k'',d_t,d_f) = \sigma_{H_w}^2 - \theta^T(n'',k'',d_t,d_f)\Phi^{-1}(d_t,d_f)\theta^*(n'',k'',d_t,d_f). \tag{12}$$

Here $\sigma_{H_w}^2$ is the variance of the virtual channel. The variance of the virtual channel with the use of CBF and EBF can respectively be calculated by the following Equations 13 and 14:

$$\sigma_{H_w;CBF}^2 = (\sigma_H^2 - \sigma_E^2)\left(N_T - \left(\frac{\Gamma(N_T + 1/2)}{\Gamma(N_T)}\right)^2\right) + \sigma_E^2 \tag{13}$$

$$\sigma_{H_w;EBF}^2 = \lambda_{max} \tag{14}$$

$\theta(n'',k'',d_t,d_f)$ is the cross-covariance vector defined by the following Equation 15 and $\Phi(d_t,d_f)$ is the auto-covariance matrix defined by the following Equation 16:

$$\theta(n'',k'',d_t,d_f) = E\{\hat{H}_{tap}(d_t,d_f) \cdot (H_w(n'',k'') - m_w)^*\} \tag{15}$$

$$\Phi(d_t,d_f) = E\{\hat{H}_{tap}(d_t,d_f) \cdot \hat{H}_{tap}^H(d_t,d_f)\} \tag{16}$$

where $\hat{H}_{tap}(d_t,d_f)$ is an $(N_t \cdot N_f \times 1)$-unit norm vector representing the measurements of the virtual channel in the resource region S, whose i-th element $[\hat{H}_{tap}(d_t,d_f)]_i$ of $\hat{H}_{tap}(d_t,d_f)$ is defined by the following Equation 17:

$$[\hat{H}_{tap}(d_t, d_f)]_i = \tag{17}$$

$$\frac{Y\left(n' + d_t \cdot \left(i - N_t \cdot \left(\left\lceil \frac{i}{N_t} \right\rceil - 1\right)\right), k' + d_f \cdot \left(\left\lceil \frac{i}{N_t} \right\rceil - 1\right)\right)}{P_d\left(n' + d_t \cdot \left(i - N_t \cdot \left(\left\lceil \frac{i}{N_t} \right\rceil - 1\right)\right), k' + d_f \cdot \left(\left\lceil \frac{i}{N_t} \right\rceil - 1\right)\right)} - m_w.$$

Here i=1, . . . , $N_t \cdot N$, $\lceil N \rceil$ is the least integer larger than or equal to N and $m_w$ is the average channel gain of the virtual channel. The average channel gain of the virtual channel with the use of CBF and EBF can respectively be calculated by the following Equation 18 and 19:

$$m_{H_w;CBF} = (\sigma_H^2 - \sigma_E^2)^{1/2} \frac{\Gamma(N_T + 1/2)}{\Gamma(N_T)} \tag{18}$$

$$m_{H_w;EBF} = 0 \tag{19}$$

Comparing the average MSE with the use of two pilot patterns $(d_t+\Delta d_t, d_f)$ and $(d_t, d_f+\Delta d_f)$, the new pilot pattern $(d_{t,new}, d_{f,new})$ is selected by the following Equation 20:

$$(d_{t,new}, d_{f,new}) = \begin{cases} (d_t + \Delta d_t, d_f) & \text{if } \sigma^2_{MSE}(d_t + \Delta d_t, d_f) \leq \sigma^2_{MSE}(d_t, d_f + \Delta d_f) \\ (d_t, d_f + \Delta d_f) & \text{if } \sigma^2_{MSE}(d_t + \Delta d_t, d_f) > \sigma^2_{MSE}(d_t, d_f + \Delta d_f) \end{cases} \quad (20)$$

At step 405, the system transmission rate with the use of dedicated pilot pattern $(d_t, d_f)$ and $(d_{t,new}, d_{f,new})$ selected at step 403 is compared by the following Equation 21. If the system transmission rate is increased with the use of the new pilot pattern, returns to step 403 while replacing the dedicated pilot pattern with the new dedicated pilot pattern and otherwise, proceeds to step 407 without change of the dedicated pilot pattern:

$$i) (d_t, d_f) \leftarrow (d_{t,new}, d_{f,new}) \text{ if } T(d_{t,new}, d_{f,new}) > T(d_t, d_f)$$

$$ii)(d_{t,opt}, d_{f,opt}) \leftarrow (d_t, d_f) \text{ if } T(d_{t,new}, d_{f,new}) \leq T(d_t, d_f) \quad (21)$$

where $T(d_t, d_f)$ is the system transmission rate taking into account of the signaling overhead for the dedicated pilot signaling and the MSE, given by Equation 22:

$$T(d_t, d_f) = \left(1 - \frac{1}{d_t d_f}\right) \cdot \log_2\left(1 + \frac{(m_{H_w}^2 + \sigma_{H_w}^2) - \sigma^2_{MSE}(d_t, d_f)}{\sigma^2_{MSE}(d_t, d_f) + 1/\gamma}\right). \quad (22)$$

Here $\gamma$ is the average SNR value.

At step 407, the optimum dedicated pilot pattern $(d_{t,opt}, d_{f,opt})$ is transmitted to the transmitter, which is determined by repeatedly processing steps 403 and 405.

Figure 5:
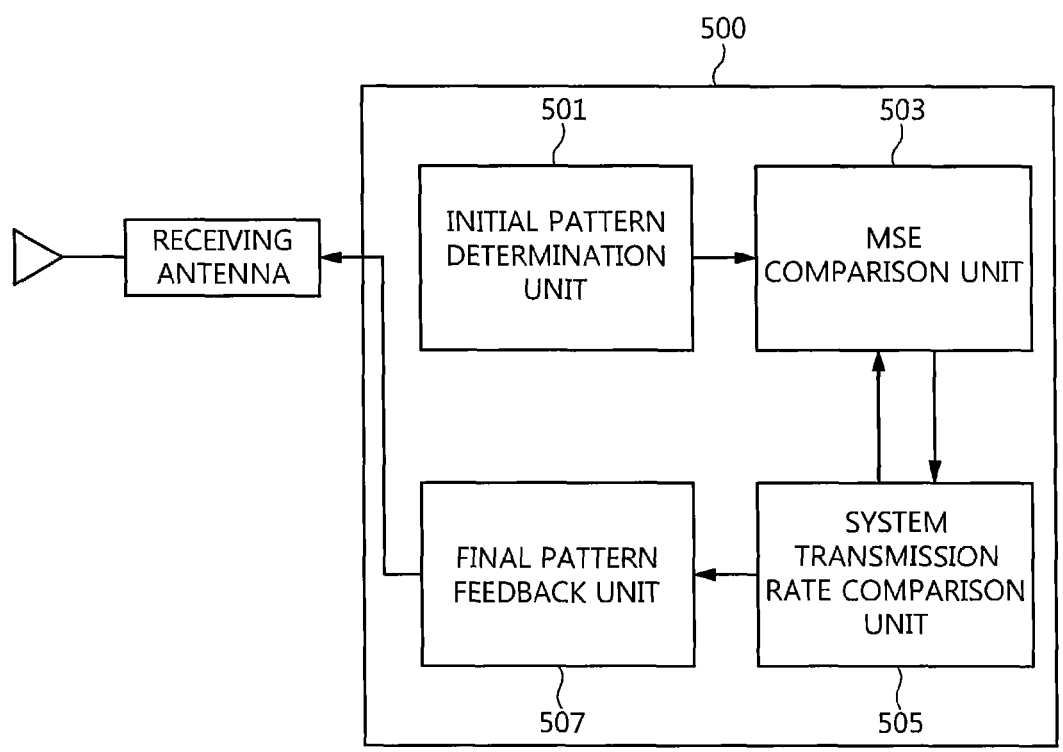
FIG. 5 is a diagram showing detailed configuration of the dedicated pilot pattern determination unit included in the unit for estimating statistical characteristics of the virtual channel of FIG. 1.

FIG. 5 is a diagram showing the detailed configuration of the dedicated pilot pattern determination unit included in the unit that estimates the statistical characteristics of the virtual channel of FIG. 1.

The dedicated pilot pattern determination unit 500 includes an initial pattern determination unit 501, an MSE comparison unit 503, a system transmission rate comparison unit 505, and a final pattern feedback unit 507.

The initial pattern determination unit 501 determines the initial dedicated pilot pattern by Equation 9. The MSE comparison unit 503 selects a pilot pattern yielding a smaller MSE with the use of two pilot patterns; one whose pilot spacing is increased by one unit in the time domain and the other one whose pilot spacing is increased by one unit in the frequency domain, according to Equation 20.

The system transmission rate comparison unit 505 compares the system transmission rate with the use of the existing pilot pattern and new pilot pattern determined by Equation 21. If the system transmission rate is increased, it replaces the pilot pattern with the new pilot pattern and transfers it to the MSE comparison unit 503, and repeats the previous process. If the system transmission rate is not increased, it uses the existing pilot pattern as the optimum one and transfers it to the final pattern feedback unit 507. The final pattern feedback unit 507 transfers the optimum dedicated pilot pattern to the transmitter.

Figure 6:
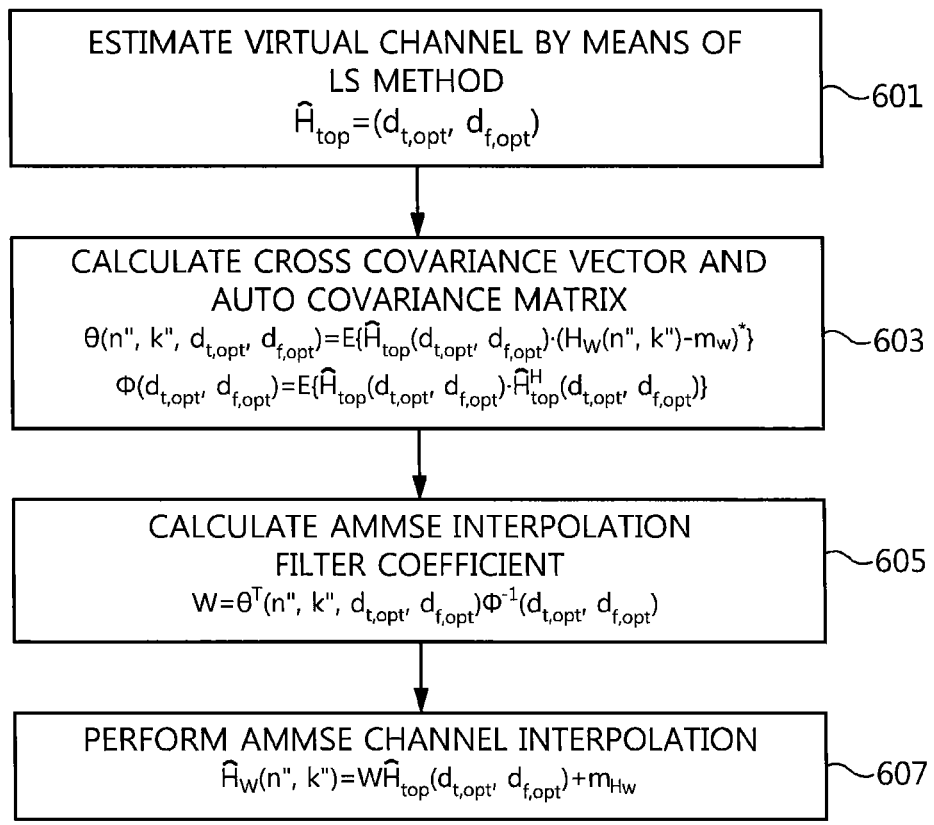
FIG. 6 is a diagram showing the AMMSE interpolation process for the estimation of virtual channel in a wireless communication system with transmit beamforming according to an embodiment of the present invention.

FIG. 6 is a diagram showing a method of AMMSE interpolation for the estimation of the virtual channel in a wireless communication system with transmit beamforming, according to an embodiment of the present invention.

At step 601, the virtual channel is estimated from the received dedicated pilot signal by means of the least square (LS) method, according to Equation 17.

At step 603, the cross-covariance vector and the auto-covariance matrix are calculated using the statistical characteristics of the virtual channel estimated at step 205 of FIG. 2 and the optimum dedicated pilot pattern determined at step 407 of FIG. 4.

At step 603, when a dedicated pilot signal is transmitted at the n'-th OFDM symbol and the k'-th subcarrier using dedicated pilot pattern $(d_{t,opt}, d_{f,opt})$ determined at step 407 of FIG. 4, the cross-covariance vector and the auto-covariance matrix for the estimation of the virtual channel in resource region S defined by Equation 10 can be calculated by the following Equations 23 and 24:

$$\theta(n'',k'',d_{t,opt},d_{f,opt}) = E\{\hat{H}_{tap}(d_{t,opt},d_{f,opt}) \cdot (H_w(n'',k'') - m_w)^*\} \quad (23)$$

$$\Phi(d_{t,opt},d_{f,opt}) = E\{\hat{H}_{tap}(d_{t,opt},d_{f,opt}) \cdot \hat{H}_{tap}^H(d_{t,opt},d_{f,opt})\} \quad (24)$$

At step 605, from the cross-covariance vector and the auto-covariance matrix calculated by Equations 23 and 24, the tap coefficient of the AMMSE interpolation filter minimizing the MSE is determined by the following Equation 25:

$$W = \theta^T(n'',k'',d_{t,opt},d_{f,opt}) \Phi^{-1}(d_{t,opt},d_{f,opt}) \quad (25)$$

At step 607, the virtual channel in resource region s is estimated by means of AMMES interpolation with the tap coefficient determined at step 605, by Equation 26:

$$\hat{H}_w(n'',k'') = W\hat{H}_{tap}(d_{t,opt},d_{f,opt}) + m_{H_w} \quad (26)$$

Figure 7:
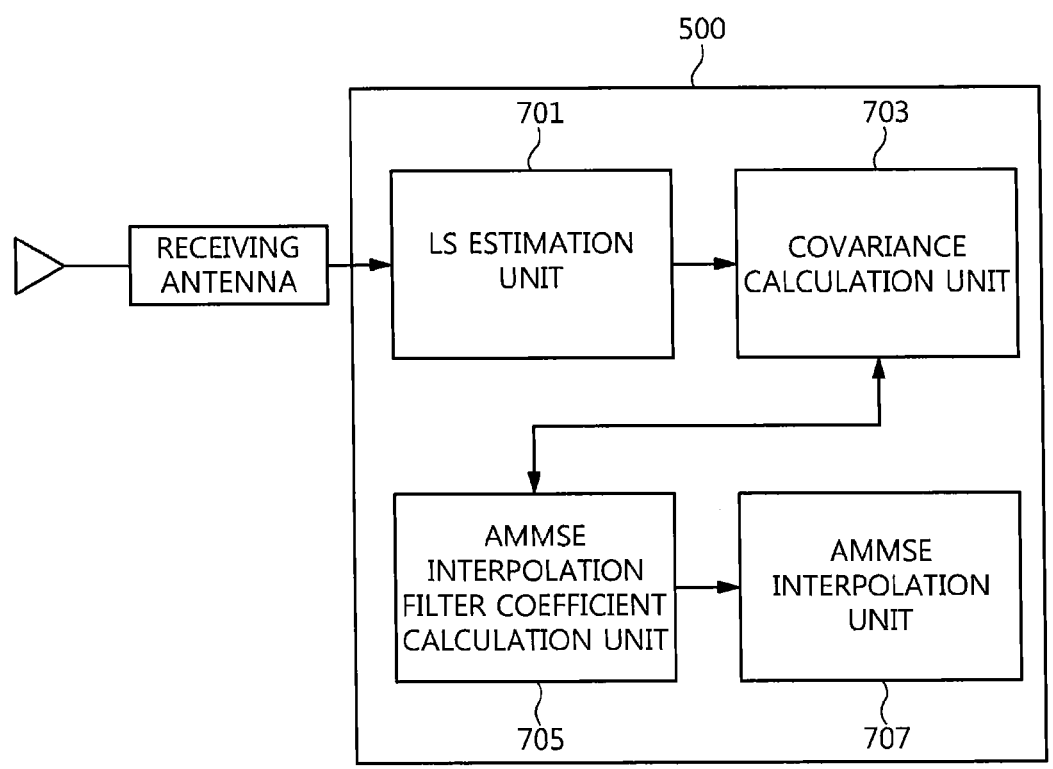
FIG. 7 is a diagram showing the configuration of the AMMSE interpolation unit for the estimation of virtual channel as an example of the virtual channel interpolation unit 132 of FIG. 1.

FIG. 7 is a diagram showing the detailed configuration of the AMMSE interpolation unit as an example of the virtual channel interpolation unit 132 of FIG. 1.

The virtual channel AMMSE interpolation unit 700 includes an LS estimation unit 701, a covariance calculation unit 703, an AMMSE interpolation filter coefficient calculation unit 705, and an AMMSE interpolation unit 707. The received dedicated pilot signal is used to estimate the virtual channel by means of the LS method at the LS estimation unit 701, by Equation 17:

The covariance calculation unit 703 calculates the cross-covariance vector and auto-covariance matrix used for the AMMSE interpolation by Equations 23 and 24, using the statistical characteristics of the virtual channel estimated at step 205 and the optimum dedicated pilot pattern determined at step 407.

The AMMSE interpolation filter coefficient calculation unit 705 determines the coefficient of the AMMSE interpolation filter using the results of the covariance calculation unit 703, by Equation 25. The AMMSE interpolation unit 707 interpolates the virtual channel using the coefficient of the AMMSE interpolation filter determined by the AMMSE interpolation filter coefficient calculation unit 705, by Equation 26.

Figure 8:
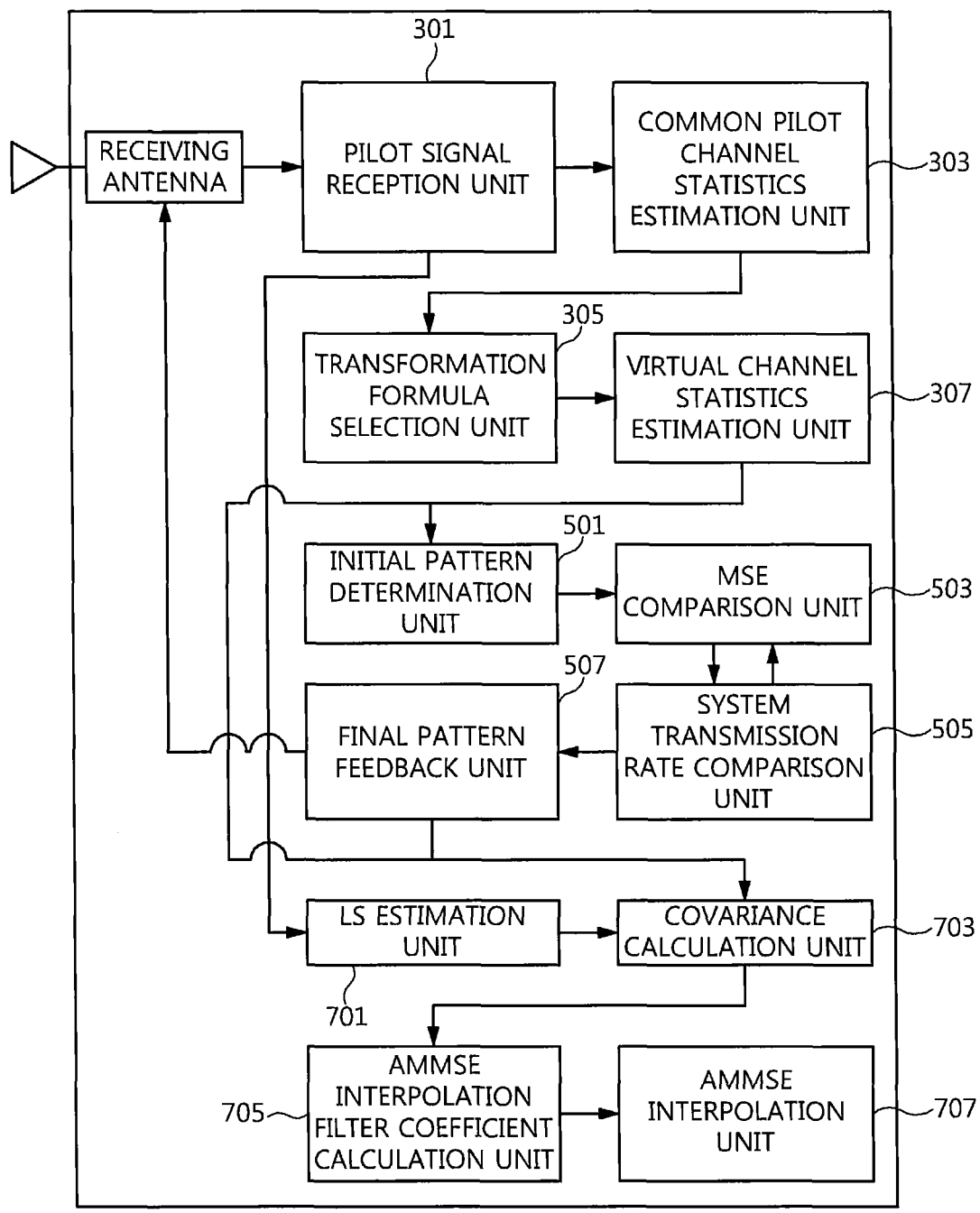
FIG. 8 is a diagram showing the overall configuration of the channel estimator in a receiver of a wireless communication system with transmit beamforming, according to an embodiment of the present invention.

FIG. 8 is a diagram showing the overall configuration of the receiver in a wireless communication system with transmit beamforming, according to an embodiment of the present invention.

The receiver includes the unit for the estimation of statistical characteristics of the virtual channel, including the correlation function estimation unit 300 of FIG. 3 and the optimum dedicated pilot pattern determination unit 500 of FIG. 5, and the AMMSE interpolation unit 700 of FIG. 7.

Common pilot signal received from the pilot signal reception unit 301 is used by the common pilot channel statistics estimation unit 303 to estimate the correlation function of the common pilot channel.

The transformation formula selection unit 305 selects the transformation formula (for example, Equation 5 or 7) according to the beamforming technique, and transfers it to the virtual channel statistics estimation unit 307.

The virtual channel statistics estimation unit 307 estimates the correlation function of the virtual channel by applying the transferred transformation formula to the correlation function of the common pilot channel estimated by the common pilot channel statistics estimation unit 303.

The initial pattern determination unit 501 determines an initial pattern for the dedicated pilot by Equation 9. The MSE comparison unit 503 changes the initial pilot pattern so that the MSE is minimized with respect to the pilot signal density, using the correlation function of the virtual channel estimated by the virtual channel statistics estimation unit 307, by Equation 20.

The system transmission rate comparison unit 505 determines the pilot pattern by Equation 21 so that the system transmission rate is maximized with respect to the pilot signaling overhead in association with the MSE comparison unit 503. The final pattern feedback unit 507 reports the final dedicated pilot pattern obtained in the above process to the transmitter. The transmitter transmits dedicated pilot signal using the dedicated pilot pattern reported from unit 507. The LS estimation unit 701 in the receiver estimates the virtual channel value as in Equation 17 by means of the LS method from the received dedicated pilot signal.

The covariance calculation unit 703 calculates the cross-covariance vector and auto-covariance matrix using the correlation function of the virtual channel estimated by the virtual channel statistics estimation unit 307 and the optimum dedicated pilot pattern determined by the final pattern feedback unit 507, as in Equations 23 and 24, respectively.

The AMMSE interpolation filter coefficient calculation unit 705 calculates the tap coefficient of an AMMSE interpolation filter by Equation 25 using the results of the covariance calculation unit 703. The AMMSE interpolation unit 707 estimates the virtual channel generated by the beamforming by applying the virtual channel estimated by the LS estimation unit 701 to the AMMSE interpolation filter, as in Equation 26.

The present invention, in a wireless communication system using a multi-antenna transmit beamforming technique, can estimate the statistical characteristics of the virtual channel generated by the transmit beamforming, using the statistical characteristics of the common pilot channel; determines the optimum dedicated pilot pattern using the estimated statistical characteristics of the virtual channel; and estimates the channel information by interpolating the channel information estimated from the dedicated pilot signal by means of affine minimum mean squared error (AMMSE) interpolation. In particular, the present invention presents a scheme and method that can practically utilize the dedicated pilot signal in a wireless communication system with transmit beamforming, by estimating the correlation function of the virtual channel from the estimated correlation function of the common pilot channel, and applying to the channel estimation with the use of an AMMSE interpolation technique. The present invention can optimally determine the dedicated pilot pattern according to the system transmission rate, maximizing the channel estimation performance in terms of the signaling overhead of dedicated pilot signal and the channel estimation MSE as well.

What is claimed is:

1. A method of estimating a channel with use of a dedicated (or user specific) pilot signal in an orthogonal frequency division multiplexing (OFDM)-based wireless communication system with multi-antenna transmit beamforming techniques, the method comprising:

a first step of estimating statistical characteristics of virtual channel, generated by beamforming, using statistical characteristics of common pilot channel estimated from a common pilot signal;

a second step of determining a dedicated pilot pattern using the estimated statistical characteristics of the virtual channel;

a third step of estimating the channel by affine minimum mean squared error (AMMSE)-type interpolation using the dedicated pilot signal; and wherein the second step comprises a process of determining an optimum dedicated pilot pattern by repeating a process of minimizing a mean squared error (MSE) with respect to a pilot signal density, a process of maximizing a system transmission rate in consideration of a pilot signal signaling overhead and channel estimation MSE, and a process of transmitting the optimum dedicated pilot pattern to a transmitter.

2. The method of claim 1, wherein the first step comprises estimating statistical characteristics of the virtual channel generated by a multi-antenna transmission technique using the estimated statistical characteristics of common pilot channel.

3. The method of claim 2, wherein if a coherent beamforming (CBF) transmission technique is used, a correlation function of the virtual channel is estimated by a following Equation 5:

$$r_{H_w}(\Delta n, \Delta k) = \qquad (5)$$

$$(\sigma_H^2 - \sigma_E^2)\left(\frac{\Gamma(N_T + 1/2)}{\Gamma(N_T)}\right)^2 \left(1 - |\rho|^2 + N_T^2\left(\frac{\Gamma(N_T)}{\Gamma(N_T + 1/2)}\right)^4 |\rho|\right)^{1/2} + \sigma_E^2 \rho^2$$

where $\Delta n$ and $\Delta k$ respectively the OFDM symbol interval in a time domain and a subcarrier interval in a frequency domain, $\sigma_H^2$ and $\sigma_E^2$ are respectively a variance of the channel and the beam weight vector, $N_T$ is a number of transmit antennas, $\Gamma(\cdot)$ is a gamma function, and $\rho$ is a normalized correlation function of the common pilot channel.

4. The method of claim 2, wherein if an eigen beamforming (EBF) transmission technique is used, a correlation function of the virtual channel is estimated by a following Equation 7:

$$r_{H_w}(\Delta n, \Delta k) = \rho \lambda_{max} \qquad (7)$$

where $\Delta n$ and $\Delta k$ are respectively the OFDM symbol interval in a time domain and a subcarrier interval in the frequency domain, $\rho$ is a normalized correlation function of the common pilot channel, and $\lambda_{max}$ is a maximum eigenvalue of a spatial correlation matrix of the channel, obtained by eigenvalue decomposition.

5. The method of claim 1, wherein the process of minimizing the MSE with respect to the pilot signal density selects a dedicated pilot pattern $d_{t,new}$, $d_{f,new}$ yielding a smaller MSE from two pilot patterns whose pilot signaling space is increased by $\Delta d_t$ in a time domain or by $\Delta d_f$ in a frequency domain, as in a following Equation 20:

$$(d_{t,new}, d_{f,new}) = \qquad (20)$$

$$\begin{cases} (d_t + \Delta d_t, d_f) & \text{if } \sigma_{MSE}^2(d_t + \Delta d_t, d_f) \le \sigma_{MSE}^2(d_t, d_f + \Delta d_f) \\ (d_t, d_f + \Delta d_f) & \text{if } \sigma_{MSE}^2(d_t + \Delta d_t, d_f) > \sigma_{MSE}^2(d_t, d_f + \Delta d_f) \end{cases}$$

where $d_t$, is an OFDM symbol interval of the dedicated pilot pattern in the time domain, $d_f$, is a subcarrier interval of the dedicated pilot pattern in the frequency domain, $\Delta d_t$, is a fixed unit for spacing of the dedicated pilot signal in the time domain, $\Delta d_f$ is a fixed unit for spacing of the dedicated pilot signal in the frequency domain, and $\overline{\sigma}_{MSE}^2(d_t+\Delta d_t,d_f)$ and $\overline{\sigma}_{MSE}^2(d_t,d_f+\Delta d_f)$ are the MSE by AMMSE interpolation with use of dedicated pilot pattern $(d_t+\Delta d_t,d_f)$ and $(d_t,d_f+\Delta d_f)$, respectively.

6. The method of claim 1, wherein the process of maximizing the system transmission rate in consideration of the pilot signaling overhead and channel estimation MSE updates the dedicated pilot pattern so as to increase the transmission rate from the dedicated pilot pattern obtained from the above claim 1, as in Equations 21 and 22:

$$\begin{aligned}&\text{i) } (d_t, d_f) \leftarrow (d_{t,new}, d_{f,new}) \text{ if } T(d_{t,new}, d_{f,new}) > T(d_t, d_f)\\&\text{ii) } (d_{t,opt}, d_{f,opt}) \leftarrow (d_t, d_f) \text{ if } T(d_{t,new}, d_{f,new}) \leq T(d_t, d_f)\end{aligned} \quad (21)$$

$$T(d_t, d_f) = \left(1 - \frac{1}{d_t d_f}\right) \cdot \log_2\left(1 + \frac{(m_{H_w}^2 + \sigma_{H_w}^2) - \overline{\sigma}_{MSE}^2(d_t, d_f)}{\overline{\sigma}_{MSE}^2(d_t, d_f) + 1/\gamma}\right) \quad (22)$$

where $\gamma$ is an average SNR, $\overline{\sigma}_{MSE}^2(d_t,d_f)$ is the MSE by AMMSE interpolation with use of dedicated pilot pattern $(d_t,d_f)$, and $m_{H_w}$ and $\sigma_{H_w}^2$ are an average gain and a variance of the virtual channel, respectively, and if, a CBF or EBF multi-antenna technique is employed, the variance of the virtual channel is calculated by a following Equation 13 or 14, respectively, $$\sigma_{H_w;CBF}^2 = (\sigma_H^2 - \sigma_E^2)\left(N_T - \left(\frac{\Gamma(N_T + 1/2)}{\Gamma(N_T)}\right)^2\right) + \sigma_E^2 \quad (13)$$

$$\sigma_{H_w;EBF}^2 = \lambda_{max} \quad (14)$$

and a corresponding average channel gain is calculated by a following Equation 18 or 19, respectively, $$m_{H_w;CBF} = (\sigma_H^2 - \sigma_E^2)^{1/2} \frac{\Gamma(N_T + 1/2)}{\Gamma(N_T)} \quad (18)$$

$$m_{H_w;EBF} = 0 \quad (19)$$

7. The method of claim 1, wherein a process of determining the optimum dedicated pilot pattern by repeating a process of minimizing the MSE with respect to the pilot signal density and a process of maximizing the system transmission rate in consideration of the pilot signal signaling overhead and the channel estimation MSE are performed by sequentially repeated processing as in a following Equation 27:

$$\begin{aligned}&\text{i) } (d_t, d_f) = (d_{t,0}, d_{f,0})\\&\text{ii) } (d_{t,new}, d_{f,new}) = \begin{cases}(d_t + \Delta d_t, d_f) & \text{if } \overline{\sigma}_{MSE}^2(d_t + \Delta d_t, d_f) \leq \overline{\sigma}_{MSE}^2(d_t, d_f + \Delta d_f)\\(d_t, d_f + \Delta d_f) & \text{if } \overline{\sigma}_{MSE}^2(d_t + \Delta d_t, d_f) > \overline{\sigma}_{MSE}^2(d_t, d_f + \Delta d_f)\end{cases}\\&\text{iii) } \begin{aligned}(d_t, d_f) &\leftarrow (d_{t,new}, d_{f,new}) & \text{if } T(d_{t,new}, d_{f,new}) > T(d_t, d_f) & \text{ Return to Step } ii)\\(d_{t,opt}, d_{f,opt}) &\leftarrow (d_t, d_f) & \text{if } T(d_{t,new}, d_{f,new}) \leq T(d_t, d_f) & \text{ Finalization}\end{aligned}\end{aligned} \quad (27)$$

where $d_t$ is an OFDM symbol interval of the dedicated pilot pattern in a time domain, $d_f$ is a subcarrier interval of the dedicated pilot pattern in a frequency domain, $\Delta d_t$ is a fixed unit for spacing of the dedicated pilot signal in the time domain, $\Delta d_f$ is a fixed unit for spacing of the dedicated pilot signal in the frequency domain, $(d_{t,0},d_{f,0})$ is an initial dedicated pilot pattern, $(d_{t,new},d_{f,new})$ is an updated dedicated pilot pattern which minimizes the MSE with respect to the pilot density, and $(d_{t,opt},d_{f,opt})$ is the optimum dedicated pilot pattern finally determined.

8. The method of claim 1, wherein the process of transmitting the optimum dedicated pilot pattern to the transmitter comprises a notification of the optimum dedicated pilot pattern determined by an optimum dedicated pilot pattern determination unit to the transmitter and the transmission of the dedicated pilot signal by the transmitter according to the optimum dedicated pilot pattern.

9. The method of claim 1, wherein the third step comprises the estimation of the virtual channel, generated by a beamforming technique, using the received dedicated pilot signal and the estimation of a whole virtual channel by interpolating the estimated virtual channel by AMMSE interpolation.

10. The method of claim 9, wherein the estimation of the whole virtual channel by interpolating the estimated virtual channel by AMMSE interpolation is performed using an AMMSE interpolation technique which compensates for an average gain of the virtual channel, as in a following Equation 26:

$$\hat{H}_w(n'',k'') = W\hat{H}_{tap}(d_{t,opt},d_{f,opt}) + m_{H_w} \quad (26)$$

where $w$ is the tap coefficient of an AMMSE interpolation filter, $\hat{H}_{tap}(d_{t,opt},d_{f,opt})$ is the virtual channel estimated from the received dedicated pilot signal, and $m_{H_w}$ is the average gain of the virtual channel.

11. An apparatus for estimating a channel with use of a dedicated pilot signal in an OFDM-based wireless communication system with multi-antenna transmit beamforming techniques, the apparatus comprising:

a virtual channel statistical characteristics estimation unit for estimating statistical characteristics of virtual channel, generated by a beamforming technique, using statistical characteristics of common pilot channel estimated from a common pilot signal;

a dedicated pilot pattern determination unit for determining a dedicated pilot pattern using the estimated statistical characteristics of the virtual channel;

a virtual channel interpolation unit for estimating the channel by AMMSE interpolation using the dedicated pilot signal; and wherein the virtual channel statistical characteristics estimation unit determines an optimum dedicated pilot pattern by repeating a process of minimizing a mean squared error (MSE) with respect to a pilot signal density and a process of maximizing a system transmission rate in consideration of a pilot signal signaling overhead and channel estimation MSE, and transmits the optimum dedicated pilot pattern to a transmitter.

12. The apparatus of claim 11, wherein the virtual channel statistical characteristics estimation unit estimates statistical characteristics of the virtual channel generated by a multi-antenna transmission technique using the estimated statistical characteristics of common pilot channel.

13. The apparatus of claim 12, wherein if a CBF transmission technique is used, a correlation function of the virtual channel is estimated by a following Equation 5:

$$r_{H_w}(\Delta n, \Delta k) = \tag{5}$$

$$(\sigma_H^2 - \sigma_E^2)\left(\frac{\Gamma(N_T + 1/2)}{\Gamma(N_T)}\right)^2 \left(1 - |\rho|^2 + N_T^2\left(\frac{\Gamma(N_T)}{\Gamma(N_T + 1/2)}\right)^4 |\rho|^4\right)^{1/2} + \sigma_E^2 \rho^2$$

where $\Delta n$ and $\Delta k$ are respectively the OFDM symbol interval in a time domain and a subcarrier interval in a frequency domain, $\sigma_H^2$ and $\sigma_E^2$ are respectively a variance of the channel and the beam weight vector, $N_T$ is a number of transmit antennas, $\Gamma(\bullet)$ is a gamma function, and $\rho$ is a normalized correlation function of the common pilot channel.

14. The apparatus of claim 12, wherein if an EBF transmission technique is used, the correlation function of the virtual channel is estimated by a following Equation 7:

$$r_{H_w}(\Delta n, \Delta k) = \rho \lambda_{max} \tag{7}$$

where $\Delta n$ and $\Delta k$ are respectively the OFDM symbol interval in a time domain and a subcarrier interval in the frequency domain, $\rho$ is a normalized correlation function of the common pilot channel, and $\lambda_{max}$ is a maximum eigenvalue of a spatial correlation matrix of the channel, obtained by eigenvalue decomposition.

15. The apparatus of claim 11, wherein the process of minimizing the MSE with respect to the pilot signal density selects a dedicated pilot pattern $d_{t,new}$, $d_{f,new}$ yielding a smaller MSE from two dedicated pilot patterns whose pilot signaling space is increased by $\Delta d_t$ in a time domain or by $\Delta d_f$ in a frequency domain, as in a following Equation 20:

$$(d_{t,new}, d_{f,new}) = \tag{20}$$

$$\begin{cases} (d_t + \Delta d_t, d_f) & \text{if } \overline{\sigma}_{MSE}^2(d_t + \Delta d_t, d_f) \le \overline{\sigma}_{MSE}^2(d_t, d_f + \Delta d_f) \\ (d_t, d_f + \Delta d_f) & \text{if } \overline{\sigma}_{MSE}^2(d_t + \Delta d_t, d_f) > \overline{\sigma}_{MSE}^2(d_t, d_f + \Delta d_f) \end{cases}$$

where $d_t$ is an OFDM symbol interval of the dedicated pilot pattern in the time domain, $d_f$ a subcarrier interval of the dedicated pilot pattern in the frequency domain, $\Delta d_t$ is a fixed unit for spacing at the dedicated pilot signal in the time domain, $\Delta d_f$ is a fixed unit for spacing of the dedicated pilot signal in the frequency domain, and $\overline{\sigma}_{MSE}^2(d_t+\Delta d_t, d_f)$ and $\overline{\sigma}_{MSE}^2(d_t, d_f+\Delta d_f)$ are the MSE by AMMSE interpolation with use of dedicated pilot pattern $(d_t+\Delta d_t, d_f)$ and $(d_t, d_f+\Delta d_f)$ respectively.

16. The apparatus of claim 11, wherein the process of maximizing the system transmission rate in consideration of the pilot signaling overhead and channel estimation MSE updates the dedicated pilot pattern so as to increase a transmission rate of the dedicated pilot pattern obtained from the dedicated pilot signal pattern determination unit, as in following Equations 21 and 22:

i) $(d_t, d_f) \leftarrow (d_{t,new}, d_{f,new})$ if $T(d_{t,new}, d_{f,new}) > T(d_t, d_f)$ (21)

ii) $(d_{t,opt}, d_{f,opt}) \leftarrow (d_t, d_f)$ if $T(d_{t,new}, d_{f,new}) \le T(d_t, d_f)$ $$T(d_t, d_f) = \left(1 - \frac{1}{d_t d_f}\right) \cdot \log_2\left(1 + \frac{(m_{H_w}^2 + \sigma_{H_w}^2) - \overline{\sigma}_{MSE}^2(d_t, d_f)}{\overline{\sigma}_{MSE}^2(d_t, d_f) + 1/\gamma}\right) \tag{22}$$

where $\gamma$ is an average SNR, $\overline{\sigma}_{MSE}^2(d_t, d_f)$ is the MSE by AMMSE interpolation with use of dedicated pilot pattern and $(d_t, d_f)$, and $m_{H_w}$ and $\sigma_{H_w}^2$ are an average gain and a variance of the virtual channel, respectively, and if a CBF or EBF multi-antenna technique is employed, the variance of the virtual channel is calculated by a following Equation 13 or 14, respectively, $$\sigma_{H_w;CBF}^2 = (\sigma_H^2 - \sigma_E^2)\left(N_T - \left(\frac{\Gamma(N_T + 1/2)}{\Gamma(N_T)}\right)^2\right) + \sigma_E^2 \tag{13}$$

$$\sigma_{H_w;EBF}^2 = \lambda_{max} \tag{14}$$

and a corresponding average channel gain can be calculated by a following Equation 18 or 19, respectively, $$m_{H_w;CBF} = (\sigma_H^2 - \sigma_E^2)^{1/2} \frac{\Gamma(N_T + 1/2)}{\Gamma(N_T)} \tag{18}$$

$$m_{H_w;EBF} = 0. \tag{19}$$

17. The apparatus of claim 11, wherein a process of determining the optimum dedicated pilot pattern by repeating a process of minimizing the MSE with respect to the pilot signal density and a process of maximizing the system transmission rate in consideration of the pilot signal signaling overhead and channel estimation MSE is performed by sequentially repeated processing as in a following Equation 27:

i) $(d_t, d_f) = (d_{t,0}, d_{f,0})$ (27)

ii) $(d_{t,new}, d_{f,new}) =$ $$\begin{cases} (d_t + \Delta d_t, d_f) & \text{if } \overline{\sigma}_{MSE}^2(d_t + \Delta d_t, d_f) \le \overline{\sigma}_{MSE}^2(d_t, d_f + \Delta d_f) \\ (d_t, d_f + \Delta d_f) & \text{if } \overline{\sigma}_{MSE}^2(d_t + \Delta d_t, d_f) > \overline{\sigma}_{MSE}^2(d_t, d_f + \Delta d_f) \end{cases}$$

iii) $(d_t, d_f) \leftarrow (d_{t,new}, d_{f,new})$ if $T(d_{t,new}, d_{f,new}) > T(d_t, d_f)$ Return to Step ii)

$(d_{t,opt}, d_{f,opt}) \leftarrow (d_t, d_f)$ if $T(d_{t,new}, d_{f,new}) \le T(d_t, d_f)$ Finalization where $d_t$ is an OFDM symbol interval of the dedicated pilot pattern in a time domain, $d_f$ is a subcarrier interval of the dedicated pilot pattern in a frequency domain, $\Delta d_t$ is a fixed unit for spacing of the dedicated pilot signal in the time domain, $\Delta d_f$ is a fixed unit for spacing of the dedicated pilot signal in the frequency domain, $(d_{t,0}, d_{f,0})$ is an initial dedicated pilot pattern, $(d_{t,new}, d_{f,new})$ is an updated dedicated pilot pattern which minimizes the MSE with respect to the pilot density, and $(d_{t,opt}, d_{f,opt})$ is the optimum dedicated pilot pattern finally determined.

18. The apparatus of claim 11, wherein the transmission of the optimum dedicated pilot pattern to the transmitter comprises a notification of the optimum dedicated pilot pattern determined by the optimum dedicated pilot pattern determination unit to the transmitter and the transmission of dedicated pilot signal by the transmitter according to the optimum dedicated pilot pattern.

19. The apparatus of claim 11, wherein the virtual channel interpolation unit estimates the virtual channel, generated by a beamforming technique, using the received dedicated pilot signal and then estimates a whole virtual channel by interpolating the estimated virtual channel by AMMSE interpolation.

20. The apparatus of claim 19, wherein the estimation of the whole virtual channel by interpolating the estimated virtual channel by AMMSE interpolation is performed using an AMMSE interpolation technique which compensates for an average gain of the virtual channel, as in a following Equation 26:

$$\hat{H}_w(n'',k'')=W\hat{H}_{tap}(d_{t,opt},d_{f,opt})+m_{H_w} \qquad (26)$$

where w is the tap coefficient of an AMMSE interpolation filter, $\hat{H}_{tap}(d_{t,opt},d_{f,opt})$ is the virtual channel estimated from the received dedicated pilot signal, and $m_{H_w}$ is the average gain of the virtual channel.

* * * * *